May 1, 1934.   C. R. BURT ET AL   1,957,317
TAP GRINDER
Filed Sept. 22, 1931   3 Sheets-Sheet 2

C. R. BURT INVENTORS
F. O. HOAGLAND
BY Joseph K. Schofield
ATTORNEY

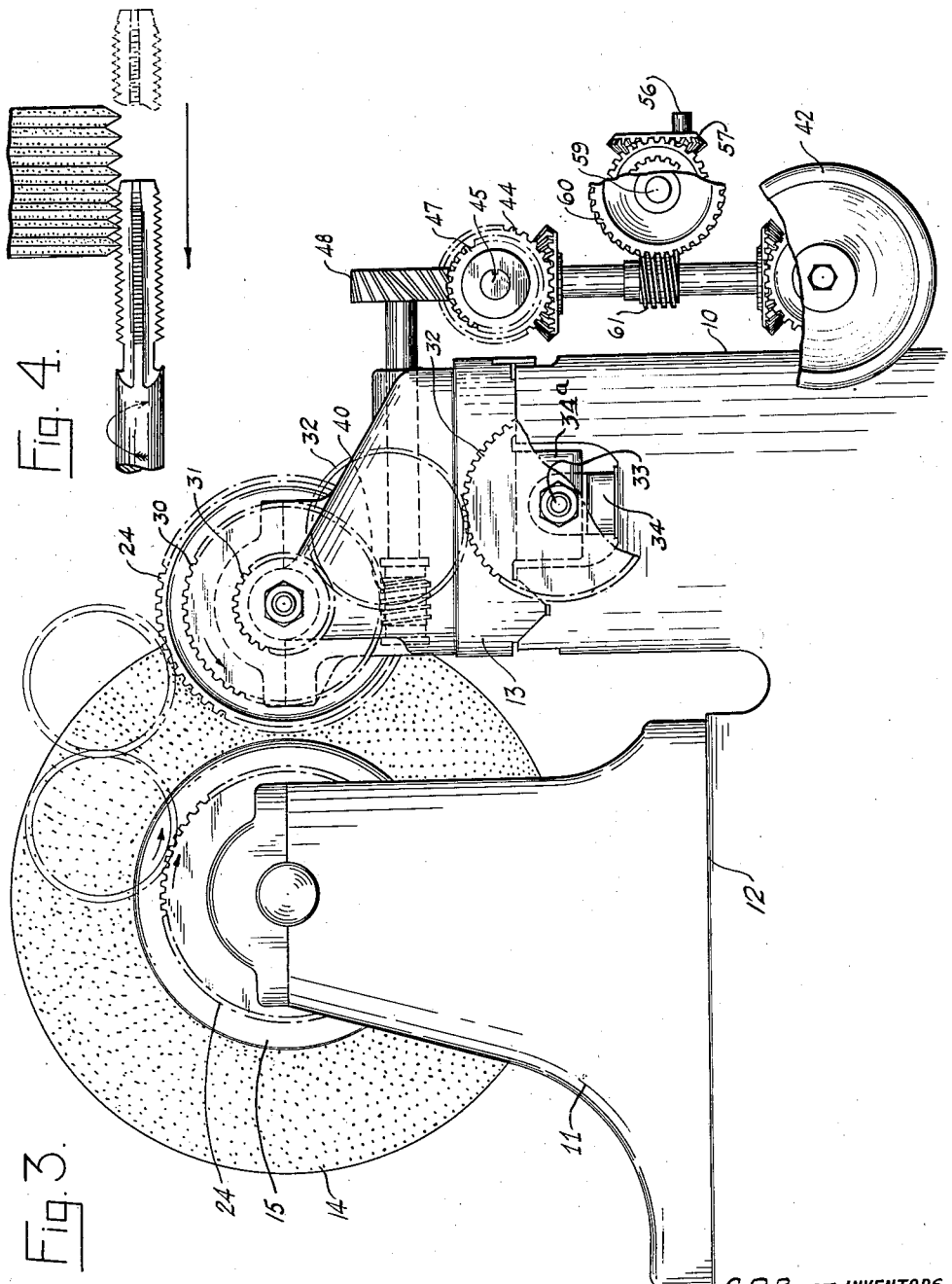

Patented May 1, 1934

1,957,317

UNITED STATES PATENT OFFICE 1,957,317

TAP GRINDER

Clayton R. Burt and Frank O. Hoagland, West Hartford, Conn., assignors to Pratt & Whitney Company, Hartford, Conn., a corporation of New Jersey Application September 22, 1931, Serial No. 564,362

6 Claims. (Cl. 51—95)

This invention relates to grinding devices and more particularly to a machine or device for simultaneously grinding a plurality of the serrations of a tap or other form of screw threaded member.

A primary object of the present invention is to provide a device adapted for grinding the screw threads of a tap or other threaded member throughout the length of the screw threaded portion while the wheel and member are maintained against relative axial movement.

Another object of the invention is to provide means to slowly advance the tap or member being ground axially past the wheel during the grinding period, this movement not exceeding a small portion of the length of the threaded portion of the member.

Another object of the invention is to provide a wheel for grinding the serrations or screw threaded portions of a tap or other member, the work engaging surface of which has a helicoidal groove formed therein, the form of the groove being adapted to form the screw threads to a predetermined contour.

Another object of the invention is to provide rotating means for the wheel and member being ground so that the wheel and member will be positively rotated in timed relation to each other and at suitably high speeds for efficient grinding operations.

A feature of importance of the invention is that a differential gear mechanism is mounted in the driving connections between the wheel and member being ground so that by rotating this differential by means additional to and independently of the connection from the wheel the rotation of the work may be supplemented.

Another object of the invention is to rotate a lead screw controlling a traversing movement of the work being ground past the wheel, this lead screw rotation being operated by the differential mechanism from its independent source of power.

With these and other objects in view, our invention includes the features of construction and operation set forth in the following specification and illustrated in the following drawings.

In the accompanying drawings annexed hereto and forming a part of this specification, we have shown our invention embodied in a simple semi-automatic device for grinding the screw threads of taps of relatively small diameter, but it will be understood that the invention can be otherwise embodied and that the drawings are not to be construed as defining or limiting the scope of the invention, the claims appended to this specification being relied upon for that purpose.

In the drawings:

Fig. 3 is an end elevation of the complete machine, and

Fig. 4 is a diagrammatic view of the wheel and tap during the final operation.

Figure 1:
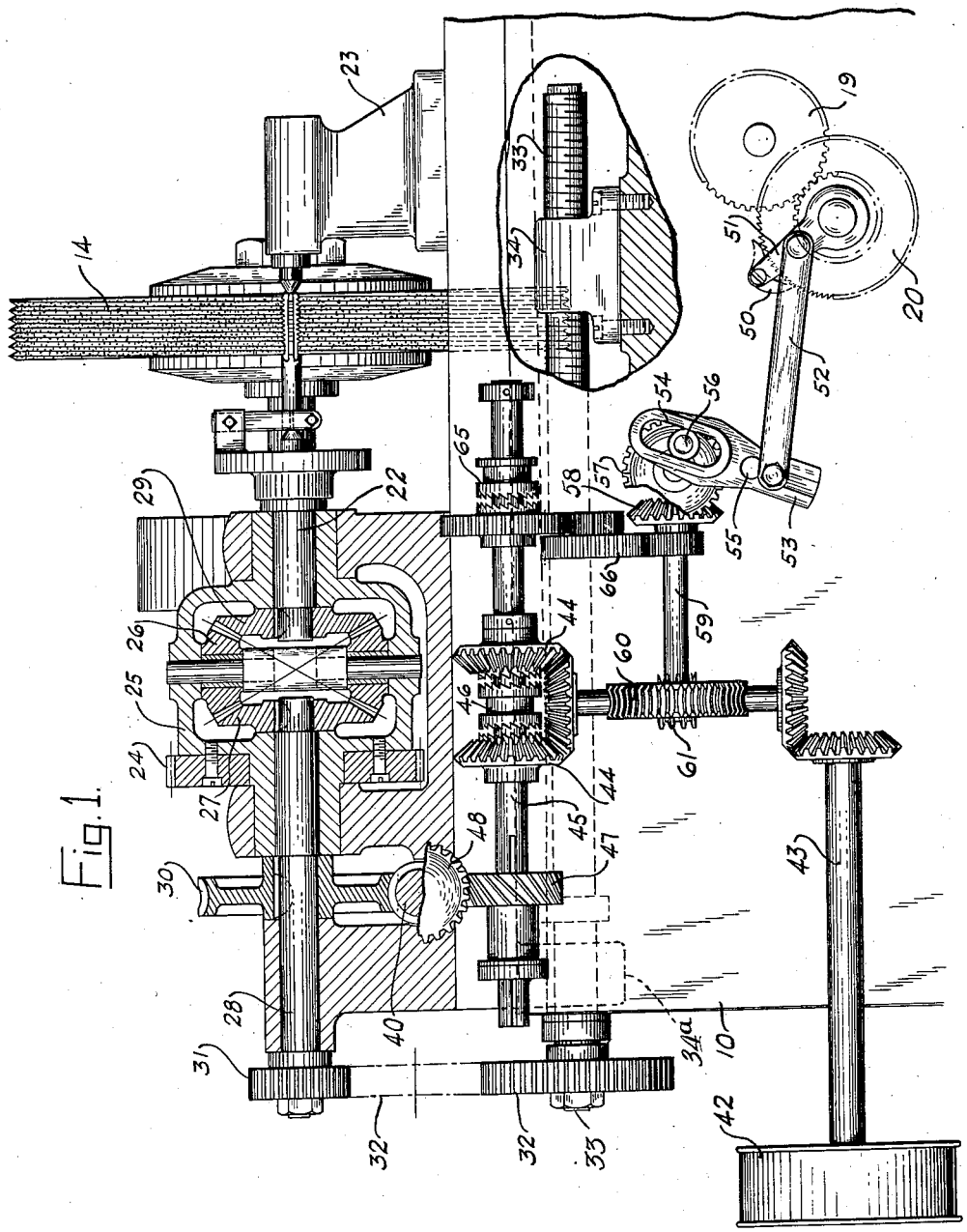
Figure 1 is a front elevation, partly in section, of the operative parts of the tap grinding device.
Figure 2:
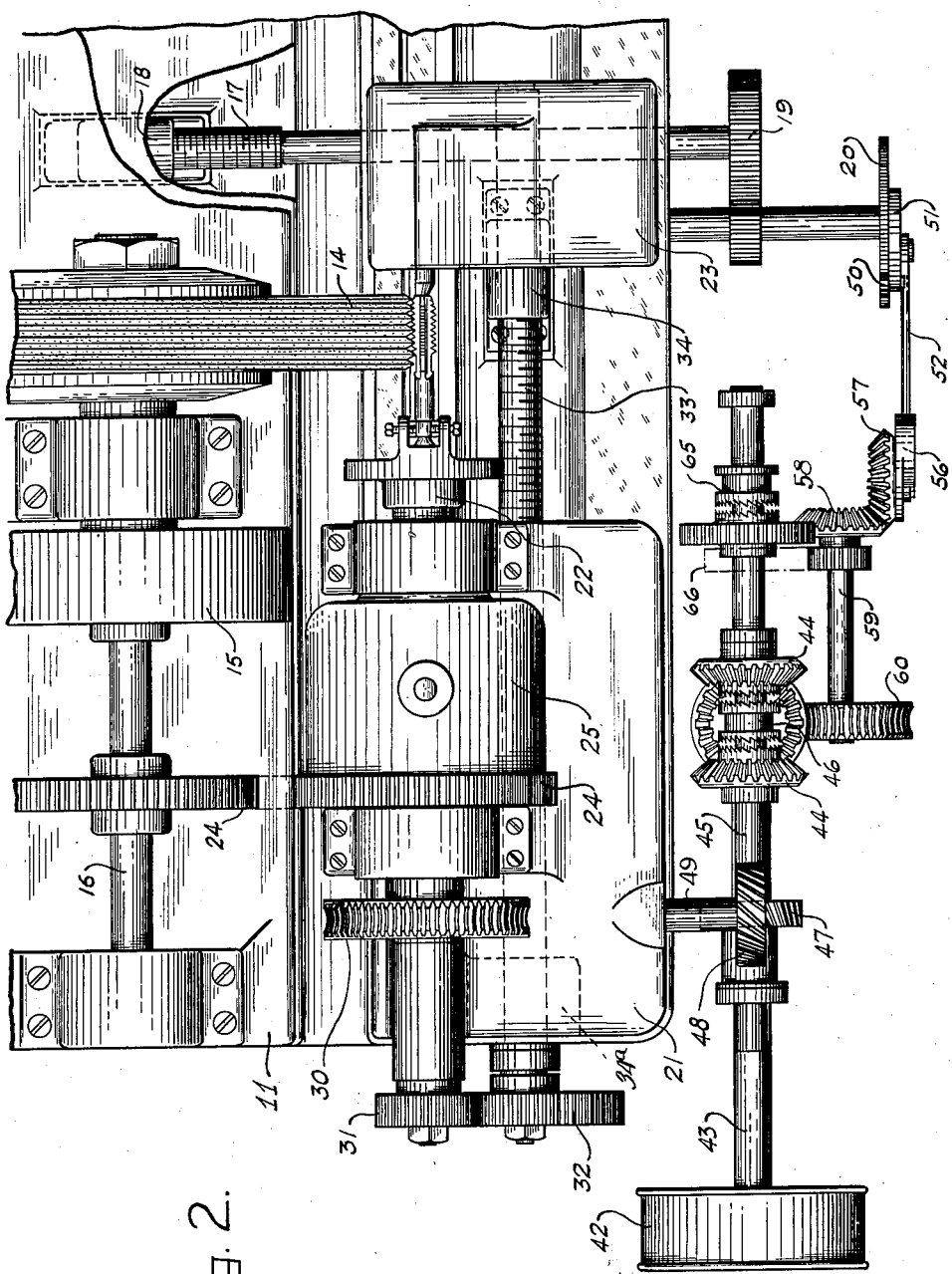
Fig. 2 is a plan view of the parts shown in Fig. 1.

In the above mentioned drawings we have shown but one embodiment of the invention which is now deemed preferable, but it is to be understood that changes and modifications may be made within the scope of the appended claims without departing from the spirit of the invention.

Briefly and in its preferred aspect, our invention may include the following principal parts: first, a base; second, a wheel slide having an abrasive wheel rotatably mounted thereon and provided on its work engaging surface with a helicoidal or helical groove, the sides of which correspond in angle to the sides of the screw threads being ground; third, a slide movable transversely of the machine and in a direction normal to the wheel slide and having work supporting and rotating means thereon; fourth, driving means for the wheel and driving connections between the wheel and work rotating means for driving the member being ground in timed relation to the rotation of the wheel; fifth, a differential mechanism within these driving connections having an independent driving source for one of its elements; sixth, a lead screw for traversing the work supporting carriage past the wheel; and seventh, driving connections between the lead screw and the differential whereby rotation of the differential by its independent driving source will rotate and traverse the member past the wheel along the helix of the screw threads being ground.

Referring more in detail to the figures of the drawings, we provide a base 10 having thereon a wheel carrying slide 11 movable upon suitable ways 12 toward and from a second slide or carriage 13 which preferably is movable along the front portion of the machine. On the first slide 11 is rotatably mounted an abrasive wheel 14 which may be driven at relatively high speed by any means such as the pulley 15 shown on shaft 16. In order to move this slide 11 toward and from the slide 13 carrying the member being ground a screw 17 is provided engaging a nut 18 on the lower portion of the slide 11. This screw 17 extends forwardly through the base 10 within which it is rotatably mounted. In front of the base the screw 17 may be conveniently rotated by gear connections 19 to a ratchet wheel 20 presently to be more fully described.

Mounted on the second or forward slide 13 is a headstock 21 having a work supporting and rotating spindle 22 cooperating with a tailstock 23 of usual form to suitably support the member being ground upon a fixed axis. In order to rotate this work spindle 22 driving connections are provided between the wheel spindle 16 and spindle 22, these being in the form of gears 24 and a differential mechanism 25 so that the rotation of the wheel 14 will rotate the member being ground through the differential in timed relation to the rotation of the wheel. As shown, the driving connections 24 drive the member 25 of the differential carrying the planet gears 26, one gear 27 of the differential 25 being fixed upon a shaft 28 which may be maintained against rotation. The opposite gear 29 of the differential 25 is rigidly attached to the work rotating spindle 22. From this description it will be seen that with the bevel gears 27 and 29 of equal size rotation of the planet gears 26 while the gear 27 remains fixed will rotate the gear 29 and work spindle 22 at exactly double the speed of the wheel 14.

This ratio in the driving connections between the wheel 14 and member being ground is used in the embodiment of the invention illustrated to properly maintain intermeshing engagement between the wheel and the work. As shown in the figures the helical groove on the periphery of the wheel 14 has a lead or pitch between convolutions equal to double that of the member being ground. The member or tap must therefore rotate at a speed double that of the wheel 14 to properly maintain the grinding progressively within the same serrations in the tap. As the work spindle 22 rotates twice for each revolution of the differential body member 25 carrying the planet gears 26 this member 25 must have a one to one ratio with the wheel spindle 16.

By reference to Fig. 3 it will be seen that the gears 24 interposed between the wheel spindle 16 and the member 25 of the differential consist of two idlers. The rotation of the wheel 14 and the work spindle 22 is therefore in the opposite direction. The lead of the helicoidal groove on the wheel is of the opposite hand from that to be ground on the work. This is the preferred form of the driving connections between the wheel 14 and the work. With rotation of the wheel and work in the same directions threads on the work having the same hand as the groove on the wheel may be ground. The thread forming action in the present invention is analogous to the method employing milling cutters described in the patent to Alexander 1,173,078.

Attached to the sun gear 27 is the shaft 28 on which is suitably secured a worm wheel 30 which may be rotated by any means, one means being illustrated which will be referred to hereinafter. Rotation of this sun gear 27 will rotate the member being ground simultaneously with its rotation derived from the wheel spindle 16 through gears 24, increasing or decreasing its speed of rotation depending upon the direction of rotation of the sun gear 27. Also on this shaft 28 supporting the normally fixed sun gear 27 is a driving pinion 31 which, by means of suitable change gears 32 to which it is connected, rotates a lead screw 33 suitably mounted for rotation within a suitable bearing 34a within the work supporting slide 13 and preferably adjacent one end thereof. This lead screw 33 engages a fixed nut 34 provided in the base 10 of the machine so that by rotation of the worm wheel 30 on the shaft 28 carrying the sun gear 27 the work being ground may be simultaneously rotated and advanced axially with its slide 13 in predetermined timed relation to its rotation.

As stated above, the wheel 14 is provided upon its periphery forming its work engaging surface with a continuous helical groove. The spacings of the serrations are a multiple of the serrations or screw threaded portions being ground. As shown, the serrations on the wheel 14 are double the size of and their lead is twice that of the thread portions being ground. Therefore for each rotation of the wheel 14 the work being ground must be rotated twice in order to properly cut a screw thread of the predetermined size. With the wheel 14 rotating in the direction of the arrow shown in Fig. 3 and with the work being ground rotating in the direction shown by an arrow thereupon at the proper relative speeds screw threads will be properly cut upon the work by moving the wheel directly into contact with the work and without axial movement of either the wheel or the work. This feeding movement of the wheel toward and from the work is accomplished by movement of the slide 11 carrying the wheel 14 through rotation of the screw 17.

A tap or other threaded member may be finished to final size in this manner, that is, without there being any axial movement of the wheel or work. That, however, may be objectionable for screw threads of high precision. This is for the reason that the helical groove formed upon the wheel cannot be precisely formed throughout the entire surface of the wheel. Any errors in the groove in the wheel 14 will be reproduced on the work. In order to finish the work accurately to its final form use is made of the independent driving means for the differential mechanism 25 by rotating its sun gear 27. This is accomplished by means of the worm 40 engaging the worm wheel 30 on the sun gear shaft 28 as above described. This introduces a supplementary movement of rotation to the work being ground adding to or subtracting from that obtained by its driving connections 24 from the wheel spindle 16. This supplemental rotation through the change gears 32 and lead screw 33 causes the member being ground to be moved axially. This axial movement of the work past the wheel is adjusted to a predetermined amount by selection of the proper change gears 32 so that the work will be axially traversed past the wheel 14 in accordance with the helix of its screw threads. The effect of this distribution of the grinding operation of the wheel upon the length of the tap is to eliminate the effect of any variations or inaccuracies of the groove formed on the wheel 14. All portions of the screw threads being ground will be contacted by extended portions of the work engaging surfaces of the wheels. Local inaccuracies of the helical groove on the wheel will not, therefore, affect the precision of the finished screw threads.

It will be noted that the tap shown in the drawings as representing work designed to be ground by the present invention is provided with a neck portion between the end of its screw threaded portion and its shank. This neck portion is sufficiently long so that one or two serrations on the wheel 14 are not engaged by the tap being ground during the first portion of the grinding operation as described above. During this period the inward feeding movement of the wheel 14 takes place while the wheel 14 and slide or carriage 13 are retained against axial movement. The neck portion is also deep enough not to be in contact when the wheel 14 has advanced to its finishing position. This portion of the wheel is therefore subject to little or no wear as it is not used during the principal portion of the grinding period. It is only when the tap is being traversed axially past these convolutions that any grinding is effected by this portion of the wheel. This portion of the wheel 14 therefore may be readily maintained to its predetermined size and conformation and will maintain the finished dimension of a large number of taps to extremely close limits without requiring redressing.

If desired this traversing movement of the work being ground past the wheel 14 may be accomplished by suitable driving connections from an independent source of power. A form of means for this purpose is shown in Fig. 1 as a pulley 42 on the outer end of a shaft 43 which continuously drives a pair of oppositely rotating bevel gears 44 freely rotatable upon a shaft 45 through suitable gear connections. On this shaft 45 and disposed between the rotating bevel gears 44 is a clutch member 46 splined to the shaft. By movement of this clutch member 46 to engage clutch portions on either of the bevel gears 44 the shaft 45 may be rotated in either direction. Rotation of this shaft 45 rotates a helical gear 47 splined to the shaft 45 and meshing with a second helical gear 48. Helical gear 48 is secured upon the shaft 49 having the worm 40 engaging worm wheel 30 on the sun gear shaft 28. Rotation therefore of these parts by pulley 42 will rotate the shaft 28 at relatively high speed in a direction determined by the position of clutch member 46. As the clutch 46 is or may be of standard or usual construction further description thereof is not thought necessary. Any means may be employed to manually shift the position of the clutch member 46 conveniently located for operation.

The slide or carriage 13 carrying the work being ground therefore may be quickly traversed past the wheel 14 in timed relation to its rotation in either direction. The work may therefore be moved past the wheel 14 to an inoperative or loading position and the slide 13 then moved back again to its initial position when another piece to be ground has been placed in position therein for operation. This traversing movement of the carriage 13 takes place during rotation of the tap or other article being ground, the change gears 32 being selected for the particular lead of screw threads being operated on.

In order to slowly advance the abrasive wheel 14 toward the work during the first portion of the grinding operation, its feeding movements may be effected by a pawl 50 oscillated back and forth relative to the ratchet gear 20, the pawl being on the outer end of an oscillating arm 51. This arm 51 is attached by means of a reach arm 52 to an oscillating lever 53 having an elongated slot 54 in one side of its pivot 55 engaging a pin 56 outstanding from the face of a bevel gear 57. This gear 57 may be drivingly connected through appropriate intermeshing gear 58 to a shaft 59. Shaft 59 is provided with a worm wheel 60 meshing with a worm 61 on one of the intermediate shafts driving the bevel gears 44. The pawl 50 will therefore be continuously oscillated and when in operative position engaging the teeth of the ratchet wheel 20 will advance the wheel 14 extremely slowly through the gearing 19 connected to the screw 17 engaging nut 18 secured to wheel carrying slide 11.

The embodiment of the invention illustrated in the drawings is designed particularly for grinding the screw threads of taps. The threads of the tap are interrupted by the longitudinal flutes formed in the tap. As the work and wheel rotate in timed relation to each other so long as the gear 27 is held against rotation the wear upon the wheel will come upon spaced sections of the wheel. This is for the reason that each time the wheel 14 rotates it contacts exactly twice with the entire circumference of the tap. As about one-half the circumference of the tap is cut away by the flutes only about one-half the circumference of the wheel would effect any grinding. In order to distribute the wear of the wheel substantially uniformly around its periphery supplemental means are provided to very slowly rotate the sun gear 27 during the feeding movement of the wheel 14 toward the work. By these means the tap is extremely slowly advanced along its helix axially and rotatively.

For the above purpose shaft 45 is provided with a clutch 65, one member of which is splined to the shaft 45 and the other is continuously rotated at extremely slow speed by gearing 66 from the shaft 59. With the clutch member 65 in its engaged position the shaft 45 is slowly rotated which rotation is imparted to the sun gear 27. The effect of this sun gear rotation is to extremely slowly add to or subtract from the rotation of the work spindle and simultaneously rotate the lead screw 33 to axially advance the carriage 13. By reason of the change gears 32 connecting the shaft 28 and the lead screw 33 this movement of the carriage 13 maintains proper engagement of the wheel 14 with the serrations of the tap.

Referring now briefly to the operation of the machine a tap blank may be mounted in position on the spindle 22 in the usual manner with its opposite end supported in the tailstock 23. This blank may be longitudinally fluted and if desired may have its screw threads partially formed by a preliminary milling operation. It is practical and is usually preferred however to produce the teeth entirely by grinding, the blanks when placed in position not having the teeth previously roughed out. With a tap blank thus mounted in position with its axis parallel to the axis of the wheel 14 is started which through gearing 24 and the differential mechanism 25 rotates the work spindle 22 and the tap blank at twice the speed of the wheel. During this period of the operation the sun gear 27 is held against rotation or very slowly rotated by the rotation of shaft 45 through clutch 65 and connected parts and the wheel 14 is advanced slowly to a predetermined advanced position. The tap is therefore ground to the full depth of the serrations. All of the surface of the wheel is utilized by reason of the slow creeping movement of the tap along the helix of its threads induced by the extremely slow rotation of the sun gear 27. As soon as the wheel 14 has been advanced to final or innermost position and grinding has been completed the clutch 46 is moved to one of its operative positions to relatively rapidly rotate the sun gear 27. This rotation traverses the tap during its rotation past the wheel so that all the threads of the tap are contacted with convolutions of the grinding surface adjacent one side not previously subjected to wear. This traversing movement effects the final grinding operation on the tap and also moves the tap to a position convenient for removal and for replacing another blank in position on the work spindle. When the new tap blank is in place the clutch 46 is moved to its opposite operative position whereupon the carriage 13 and the tap blank are advanced to operative position relative to the wheel.

What we claim is:

1. A screw thread grinding machine comprising in combination, a base, a wheel support thereon, a rotatably mounted wheel on said support having a helical groove formed in its periphery, a work supporting and rotating means on said base, means to rotate said work in said supporting means in timed relation to said wheel while maintaining the axes of said work and wheel parallel to each other, means to axially move said wheel and work relative to each other, means to vary the relative rotation of said work and wheel in accordance with said axial movement, and means to relatively move said work and wheel toward and from each other.

2. A screw thread grinding machine comprising in combination, a base, a wheel support thereon, a rotatably mounted wheel on said support having a helical groove formed in its periphery, a work supporting and rotating means on said base, means to rotate said work in said supporting means in timed relation to said wheel while maintaining the axes of said work and wheel parallel to each other, means to relatively move said work and wheel toward and from each other, means to slowly advance said work axially past said wheel in accordance with the helix of its thread, and means to vary the relative rotation of said work and wheel in accordance with said axial movement.

3. A screw thread grinding machine comprising in combination, a base, a wheel support thereon, a wheel on said support having a helical groove in its periphery, a work support on said base for rotatably supporting a work blank with its axis parallel to the axis of the wheel, means to rotate said wheel and work in timed relation to each other while said wheel is maintained against axial movements, means to relatively move said wheel and work toward and from each other, means to relatively traverse said work and wheel axially during engagement of said work and wheel, and means to advance and retard rotation of said work relative to said wheel during movements of the work past the wheel.

4. A screw thread grinding machine comprising in combination, a base, a wheel mounted thereon having a helical groove in its periphery, means to rotate said wheel, work supporting and rotating means on said base, driving connections between said wheel and work to rotate said work and wheel in timed relation to each other, a differential mechanism in said driving connections, independent means to rotate a member of said differential mechanism, and connections between said member and said work suport to traverse said work axially past said wheel when said member is rotated.

5. A screw thread grinding machine comprising in combination, a base, a wheel mounted thereon having a helical groove in its periphery, means to rotate said wheel, work supporting and rotating means on said base, driving connections between said wheel and work to rotate said work and wheel in timed relation to each other, a differential mechanism in said driving connections, independent means to rotate a member of said differential mechanism, conections between said member and said work support to traverse said work axially past said wheel when said member is rotated, and manual means controlling the rotation of said member in either direction.

6. A screw thread grinding machine comprising in combination, a base, a slidable wheel support thereon, a rotatably mounted wheel on said support, said wheel having a helical groove within its periphery, work supporting means on said base, means to rotate said work in timed relation to said wheel and in the opopsite direction, a differential mechanism in said work rotating means, means to relatively traverse said work and wheel axially, and connections between said differential mechanism and said traversing means for effecting said traversing movement during engagement of said wheel with said work and in accordance with the lead of the thread being ground.

CLAYTON R. BURT.
FRANK O. HOAGLAND.